United States Patent
Ely

(10) Patent No.: US 9,165,361 B1
(45) Date of Patent: Oct. 20, 2015

(54) VIDEO TRACKING WITH JITTER, SLEWING, OR ZOOM

(71) Applicant: Raytheon Company, Waltham, MA (US)

(72) Inventor: Richard W. Ely, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 35 days.

(21) Appl. No.: 14/208,065

(22) Filed: Mar. 13, 2014

(51) Int. Cl.
*G06K 9/00* (2006.01)
*G06T 7/00* (2006.01)
*G06T 7/20* (2006.01)

(52) U.S. Cl.
CPC ............... *G06T 7/0024* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 8,761,457 B1 * | 6/2014 | Seitz et al. | 382/113 |
| 2008/0181488 A1 * | 7/2008 | Ishii et al. | 382/154 |
| 2010/0232728 A1 * | 9/2010 | Leprince et al. | 382/294 |
| 2013/0222589 A1 * | 8/2013 | Lalonde et al. | 348/148 |

OTHER PUBLICATIONS

"Computer Vision System Toolbox: Object Tracking and Motion Estimation", [Online]. Retrieved from the Internet: <URL: http://www.mathworks.com/products/computer-vision/description5.html>, (Accessed Feb. 13, 2014), 2 pgs.

Ali, Saad, et al., "COCOA: Alignment, Object Detection, Object Tracking and Indexing of Aerial Videos", [Online]. Retrieved from the Internet: <URL: http://vision.eecs.ucf.edu/projects/COCOAWebsite/CocoaWebsite/featured_project.html>, (Accessed Feb. 13, 2014), 6 pgs.

Milanfar, Peyman, "Precise Multi-Frame Motion Estimation and Its Applications", [Online]. Retrieved from the Internet: <URL: http://users.soe.ucsc.edu/~milanfar/talks/MilanfarProgReviewMay05.pdf>, (May 2005), 30 pgs.

Prasad, Kauleshwar, et al., "A Review on Object Detection in Video Processing", International Journal of u- and e-Service, Science and Technology, 5(4), (Dec. 2012), 15-20.

Rav-Acha, Alex, et al., "Online video registration of dynamic scenes using frame prediction", WDV'05/WDV'06/ICCV'05/ECCV'06 Proceedings of the 2005/2006 International Conference on Dynamical Vision, (2007), 151-164.

Sheikh, Yaser, et al., "Geodetic Alignment of Aerial Video Frames", Video Registration, Video Computing Series, Kluwer Academic Publishers, [Online]. Retrieved from the Internet: <URL: http://www.crcv.ucf.edu/papers/shah/YaserChapter.pdf>, (2003), 141-177.

\* cited by examiner

*Primary Examiner* — Shervin Nakhjavan
(74) *Attorney, Agent, or Firm* — Schwegman Lundberg & Woessner, P.A.

(57) ABSTRACT

Generally discussed herein are systems and apparatuses that are configured to and techniques for tracking an object in video data. According to an example, a technique can include (1) obtaining first and second video frames, the first video frame captured at a time before the second video frame was captured and the first and second video frame including a first and second image of a common geo-location, respectively, (2) projecting, using a computer processor, the first video frame and the second video to their respective ground planes, or (3) projecting the first and second ground projected video frames to a space in a center video frame captured at a time between the first and second video frames, the center video frame including a third image of the common geo-location.

20 Claims, 7 Drawing Sheets

VIDEO TRACKING WITH JITTER, SLEWING, OR ZOOM

TECHNICAL FIELD

Examples generally relate to tracking an object in video data. More specifically, examples relate to tracking an object in video data that includes jitter, slewing, or zooming in or out.

TECHNICAL BACKGROUND

Video tracking is a process of locating a position of an object in video data over time. Video tracking can be used in security, surveillance, augmented reality, traffic control, or video editing applications, among others. Video tracking can include object recognition. A goal of video tracking can be to correlate objects in different video frames.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Robust moving target detection or tracking using video data can be challenging. A challenge associated with detecting or tracking using video data can include using a moving sensor platform (e.g., a moving camera that is capturing the video data), poor geometric metadata, frame-to-frame jitter, sensor (e.g., camera) slewing (e.g., pivoting or rotating) or zooming, low dynamic range, dense traffic or object conditions, or an occlusion. Discussed herein are apparatuses, systems, and techniques for detecting or tracking an object in video (e.g., Full Motion Video (FMV)). Such apparatuses, systems, and techniques can leverage image registration techniques, image-based change detection, image-to-image correlation techniques, or image-to-ground or ground-to-image frame camera projection. An end-to-end system, apparatus, or technique that can detect a moving vehicle in video, track the object, or provide the image or ground locations for the object is discussed herein. Speed or direction (e.g., heading) of an object can be determined.

Figure 1:
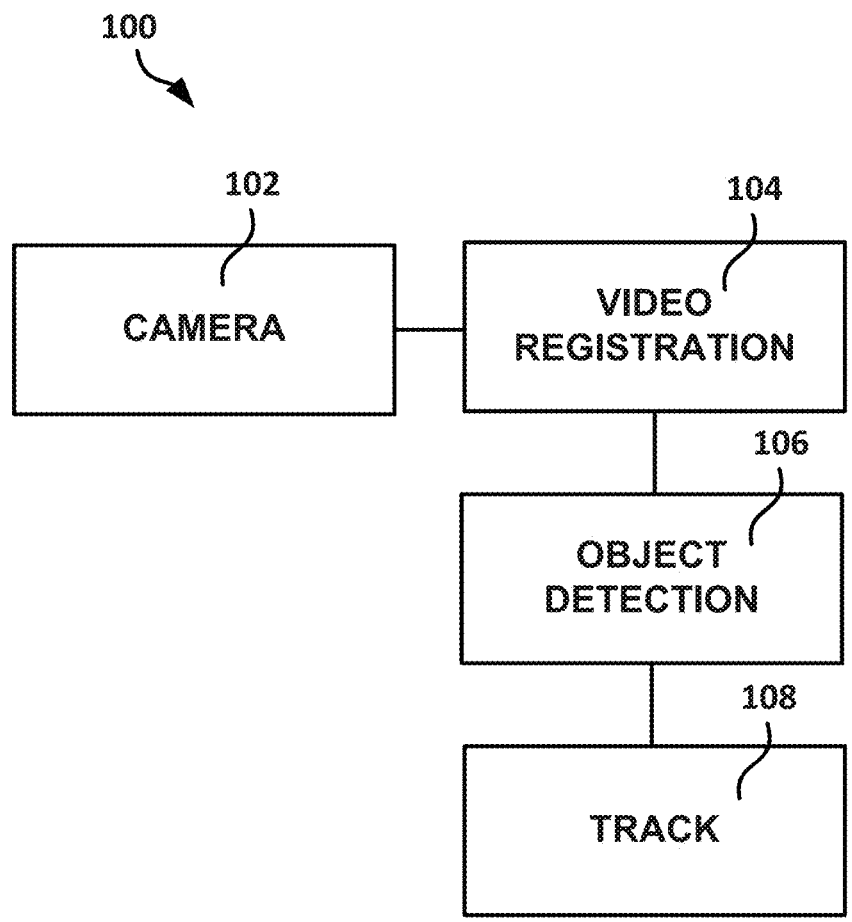
FIG. 1 shows a block diagram of an example of a system for object recognition or tracking.

FIG. 1 shows an example of a system 100 configured for object detection or tracking. The system 100 can include a camera 102 a video registration module 104, an object detection module 106, or a track module 108.

The camera 102 can be any sensor capable of providing video data sufficient for the video registration module 104 to perform operations on. The camera 102 can be configured to capture FMV. The camera 102 can produce video at a variety of frame rates. The camera 102 can be stationary or in motion (e.g., such as to pivot or slew). The camera 102 can be capable of zooming, changing the contrast of a video frame, or capturing different sized video frames. The camera 102 can capture color, infrared, or black and white images or video frames The video registration module 104 can register a video frame captured by the camera 102. The registration of the video frame can be to a high accuracy reference image. The video registration module 104 can adjust the geometry of the video frame to match the reference image. The video registration module 104 can produce a perspective transform of the video frame so as to adjust the geometry of the video frame to match the reference image.

The perspective transform can project the image of the video frame to a ground plane of the respective video frame. This transformed video frame can then be projected back to the image of the video frame, such as by using the inverse perspective transform. The video registration performed by the video registration module 104 can be performed as a preprocessing step or can be done as the video frame is captured by the camera 102. The video registration module 104 can register video frames in real-time.

The video registration module 104 can geographically position a video frame more accurately than location information embedded in video metadata. The video registration module 104 can register a video frame to within two meters of the true geo-location (e.g., a specific position on the Earth) of the video frame.

The object detection module 106 can detect changes between video frames. The object detection module 106 can perform change detection in a space of a video frame between (e.g., halfway between) two video frames, such as by projecting an image of an earlier video frame and a later video frame to the geo-location of a video frame between the earlier video frame and the later video frame.

Change detection can include receiving a first video frame and a second video frame and projecting the first and second video frames to a space occupied by a video frame between (e.g., halfway between) the first and second video frame. For example, if video frame zero and video frame twenty are received at the object detection module 106, the object detection module 106 can project the image of both video frames zero and twenty to the ground of their respective video frames and then project the ground projections to video frame ten. The video registration module 104 can determine the perspective transform parameters that are used in performing the transforms to a video frame between the two received video frames. Other frame spaces, such as the frame space of the earlier video frame, later video frame, any video frame between the earlier video frame and the later video frame, or ground, can be used as the space to which the earlier and later video frames can be projected. Projecting both the earlier video frame and the later video frame to a video frame space of another video frame intermediate to the earlier and later video frames can help better align the earlier and later video frames for object detection than may be accomplished using the video registration module 104.

The object detection module 106 can determine pixels that have changed from the earlier video frame to the later video frame, such as by comparing the pixels of the transformed video frames. The object detection module 106 can gather pixels that have changed into contiguous segments or outline the contiguous pixels. The object detection module 106 can identify gathered or outlined segments that are about the size of an object of interest. More details regarding operations that can be performed by the object detection module are detailed in and discussed with regard to FIG. 2.

The track module 108 can track pixels associated with changes from the earlier frame to the later frame. Similarly, the track module 108 can track an object of interest (e.g., pixels associated with an object of interest) in the second frame to the first frame. The track module 108 can consolidate the tracks obtained to eliminate duplicates. The track module can retain the best representation of the object (e.g., the outline or gathered pixels that best represents the object), such as to help in tracking in subsequent frames.

The track module 108 can analyze the tracks obtained to remove erroneous tracks. An erroneous track can include a track that oscillates back and forth (e.g., on some fixed object) or moves in an impossible or erratic manner. More details regarding operations that can be performed by the track module 108 are detailed in and discussed with regard to FIGS. 4 and 5.

A video frame captured after the later video frame can be registered by the video registration module 104 and sent to the object detection module 106. In one or more embodiments, the subsequent video frame can be pre-registered and the pre-registered subsequent video frame can be sent to the object detection module 106, such as without using the video registration module 104. The subsequent video frame can be half a frame interval from the later video frame. The active tracks or objects associated with the active tracks from the previous iteration of detection and tracking using the object detection module 106 and the track module 108 can be provided as inputs to object detection module 106 or the track module 108, such as for use in this next iteration of tracking so that the objects can continue to be tracked. These inputs can ensure that an object is tracked even if the previous iteration of change detection by the object detection module 106 did not identify the object as a change. This can happen when an object (e.g., a vehicle, person, pet, or any other immobile or mobile matter) stops moving or occupies the same location for a period of time greater than the amount of time between one or more video frames, such as a vehicle stopped at a traffic light or stop sign.

Figure 2:
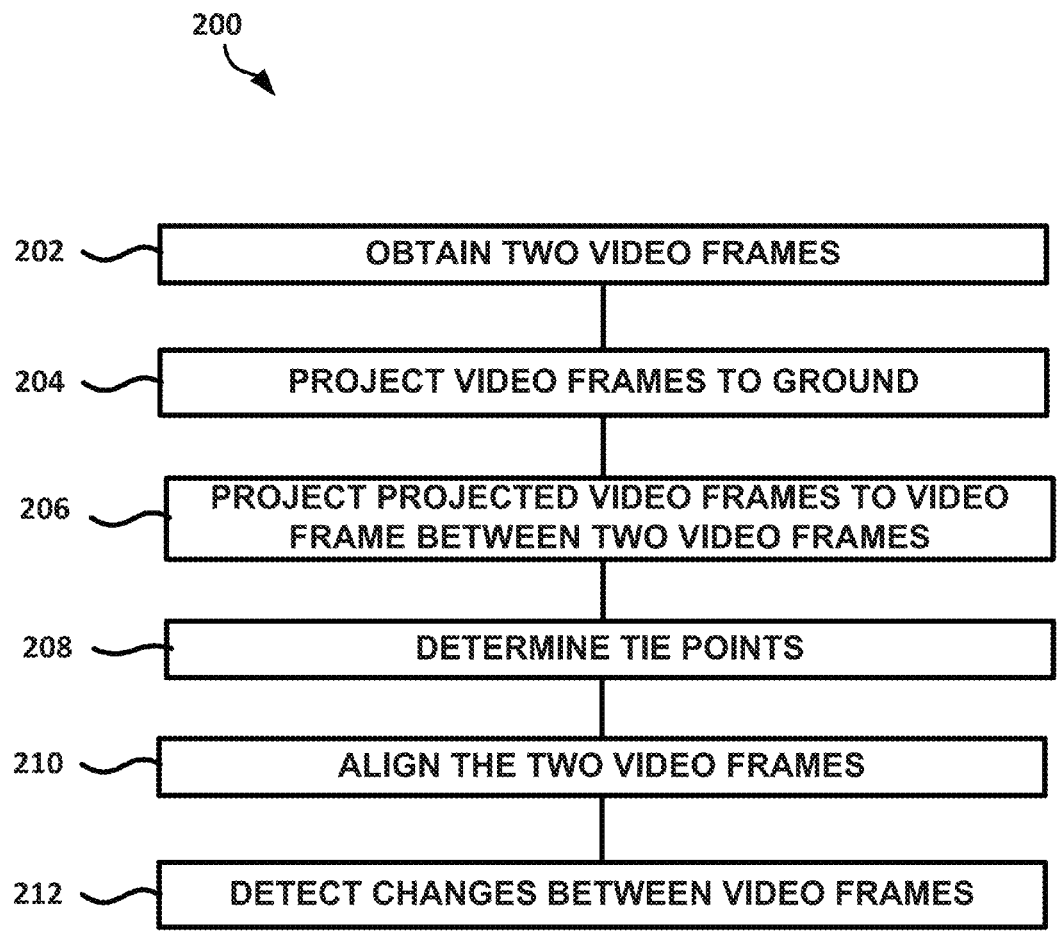
FIG. 2 shows a flow diagram of an example of a technique for object detection.

FIG. 2 shows a flow diagram of an example of a technique 200 for object detection, such as can be implemented using the object detection module 106. At 202, two video frames (e.g., an earlier and a later video frame) can be obtained. One or more of the two video frames can be registered, such as by using the video registration module 104. The two video frames can include two new, previously unreceived, or registered or unregistered video frames. The video frames can be received at the object detection module 106.

The two video frames can be spaced far enough apart in time, such that an object of a specified length has time to move the specified length between two video frames. This specified time can be considered a minimum frame time separation. The object can be assumed to be moving at a specified minimum speed, so as to help determine the length of time between video frames. For example, if the object is a car that is twelve feet long and the minimum speed is ten miles per hour, the video frames can be separated by at least 0.818 seconds so as to help ensure that the car has travelled twelve feet between frames. Other minimum speeds and specified lengths can be used, so long as at least one video frame exists between the two video frames. Using this frame spacing can help ensure that the object's position does not overlap in the two video frames. Using this frame spacing can allow one or more processes associated with object detection or tracking to operate while the object detection module 106 is waiting for a subsequent frame.

The two video frames (a first, earlier video frame and a second, later video frame) can be registered to each other. Note that the video registration module 104 can provide a starting geometry for the two video frames, but the two video frames may not have an exact enough alignment. The video frames can be better aligned by registering the video frames to each other. The space in which the registration (e.g., and the change detection) can be performed can be between the video frames, such as at a video frame halfway between the two video frames, the earlier video frame, the later video frame, or another video frame between the two video frames.

The registration process can include the projecting processes at 204 and at 206. At 204, each of the two video frames can be projected down to their respective ground plane, such as by using a projective transform (e.g., the perspective transform). At 206, the ground-projected video frames can be projected into a center video frame (i.e. a frame between the two video frames), such as by using the projective transform.

At 208, tie points for each of the two video frames can be determined. The tie points can be determined between each of (1) the earlier video frame and the center video frame and (2) the later video frame and the center. The tie points can be extracted using a normalized cross-correlation technique or other tie point extraction technique. At 210, the two video frames can be aligned. The alignment can be between each of (1) the earlier video frame with the center and (2) the later video frame and the center video frame. Aligning the video frames can include a two dimensional affine transformation (e.g., a general linear transformation between two vector spaces). The affine transformation can be fit to the tie points and applied to the respective video frame to bring it into alignment with the center video frame. Such a transformation can align the two video frames with the center video frame and with each other. Such a transformation can help mitigate an effect of an error in registering a video frame, such as by using the video registration module 104. The affine transformation can include a combination of mathematical transformations such as translation, rotation, reflection, contraction, expansion, dilation, shear, a combination thereof, or other collinear transformation.

Note that the two video frames can have intensity differences at a same geo-location in the frame that are not caused by a moving object, such as can be due to flicker in the video capture, a change in viewing perspective from a moving sensor (e.g., camera) platform, or from other light changes like a cloud moving in front of the sun. To mitigate these differences a remapping of the intensities of the earlier video frame to match those of the later video frame (or vice versa) can be computed.

At 212, changes between the aligned video frames can be detected. The change detection can include determining a pixel intensity difference between the earlier and later video frame. The change detection can include comparing the pixel intensity differences (e.g., an absolute value of the pixel intensity differences) to a specified threshold or to a dynamically derived threshold based on a histogram of difference values so as to determine if the pixel was substantially the same or substantially different in both the earlier and the later video frames. Places in the images where no change has occurred can have a pixel intensity difference of near zero. Pixel intensity differences in the earlier and later video frames that are not substantially the same can be identified.

Contiguous differences in the pixels can be outlined or otherwise identified. Identified contiguous pixel changes including a size within a specified shape range or a size within a specified size range can be identified.

Note that the sign of the pixel intensity difference does not necessarily tell where the object is in the respective frame. Note that an object moving from one position in the earlier frame to another position in the later frame will generally create two locations with substantial pixel differences. The first location can be the position of the object in the earlier frame and the second location can be the position of the object in the later frame. To determine where the object is located in the respective aligned frames, a gradient can be measured over the outline (e.g., the entire outline) at both positions in both the earlier and later video frames. The measured gradient that includes the stronger contrast in the outline is where the object can be assumed to be in that respective video frame.

The outline with the stronger contrast can help determine which track points will be used in a correlation technique (e.g., a normalized cross-correlation, an edge correlation, or a hybrid correlation technique). The outline with the stronger contrast can help determine points that can be used to track the object forwards or backwards.

Changes in pixel intensity that are not related to an object of interest (i.e. a false change) can be detected or discarded. If the video frame with a stronger gradient along the outline includes a gradient that is weak (e.g., below a specified threshold) the change candidate can be considered a false candidate. If the gradient of the outline in the earlier video frame is nearly equal to the gradient of the outline in the later video frame, than the change candidate can be considered a false candidate.

It can be determined whether the change candidate (e.g., identified contiguous pixels within a specified range or a size) at a particular location in the scene is at that location in the earlier video frame or in the later video frame, such as by determining which video frame includes the stronger contrast in the outline. These change candidates can be provided to the track module 108.

A more detailed explanation of what is meant by a gradient follows. An image can be thought of as a function $z=f(x,y)$ where x is the row value, y is the column value of the image, and z is the intensity at the pixel that resides at that row and column. The gradient can be obtained, for example, from the partial derivatives with respect to x and with respect to y. The gradient direction can be the direction of maximum increase in value. The magnitude of increase can be the square root of $(\Delta f_x^2 + \Delta f_y^2)$ and the phase (or orientation) can be $\arctan(\Delta f_y, \Delta f_x)$, where $\Delta f_y$ and $\Delta f_x$ are the partial derivatives with respect to image column intensity and image row intensity, respectively There are a number of gradient operators that can be used to obtain the gradient as described.

If the object is determined to be in the earlier frame, then the object can be tracked from the earlier frame until it exits the field of view or until the object is tracked to the later video frame. If the object is determined to be in the later frame, then the object can be tracked from the later frame until it exits the field of view or until the object is tracked to the earlier video frame.

Figure 3:
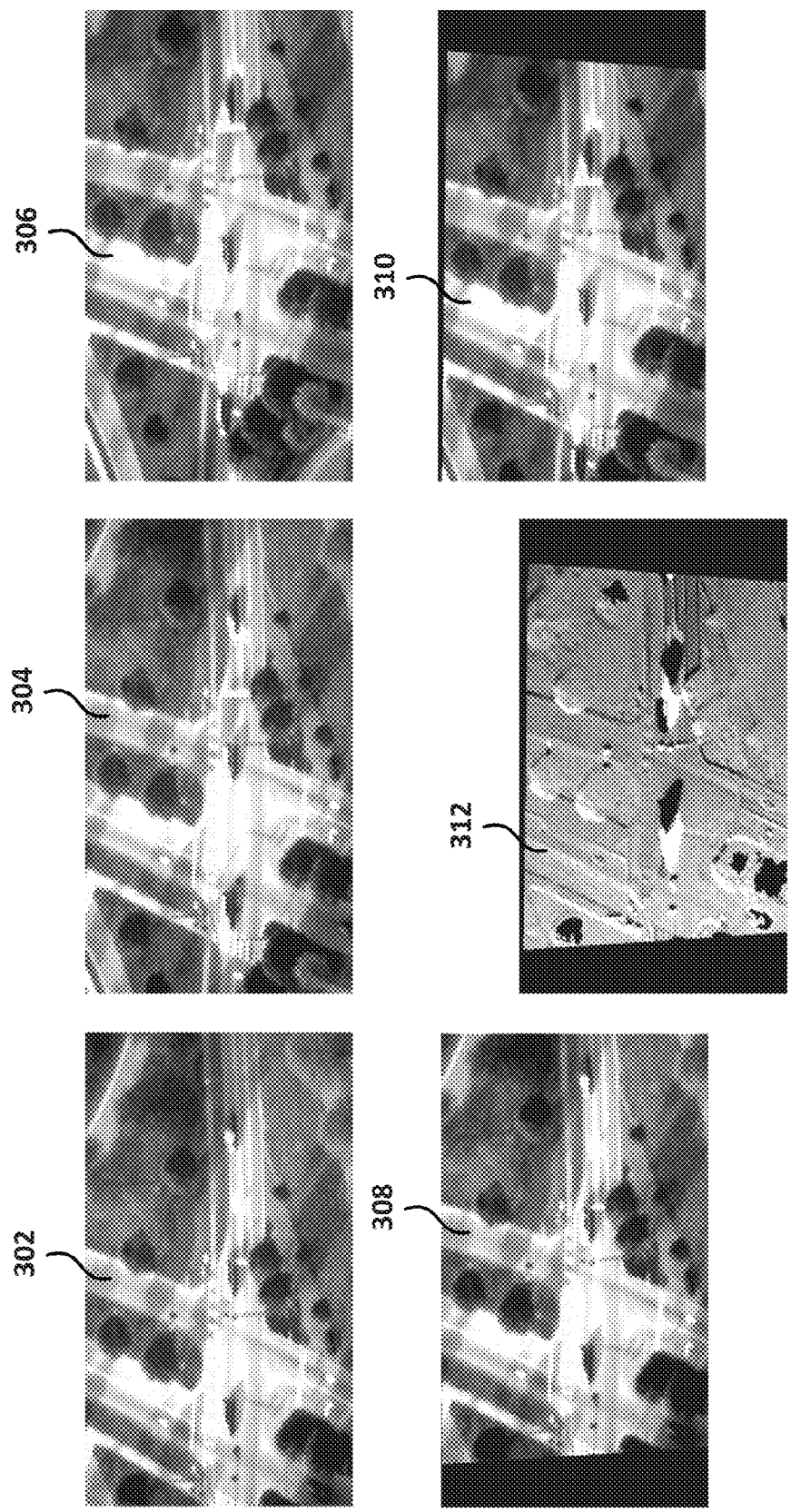
FIG. 3 shows video frames, projected video frames, and a video frame depicting the difference between projected video frames.

The technique 200 may be better understood through use of a picture example. FIG. 3 shows a series of video frames (e.g., an earlier video frame 302, a center video frame 304, and a later video frame 306), projected video frames 308 and 310, and a difference video frame 312 depicting the difference between projected video frames. The earlier video frame 302 can be projected to the ground space of the earlier video frame 302 and then to the space of the center video frame 304. The result can be the projected video frame 308. Note that the projected video frame 308 basically shows the region where the earlier video frame 302 and the center video frame 304 overlap. The projected video frame can be altered so as to have the same orientation and scale as the center video frame.

The later video frame 306 can be projected to the ground space of the later video frame 306 and then to the space of the center video frame 304. The result can be the projected video frame 310. Note that the projected video frame 310 basically shows the region where the later video frame 306 and the center video frame 304 overlap. A difference in pixel intensity between the projected video frame 308 and the projected video frame 310 can be determined. The result can be the difference video frame 312. The difference video frame 312 of FIG. 3 shows that there a number of changes that have occurred in the center video frame space between the earlier video frame 302 and the later video frame 306. These changes are shown as bright or dark spots in the difference video frame 312. Contiguous regions of bright or dark, such as in the case of FIG. 3, can be identified as change candidates for use in a tracking technique, such as can be implemented by the track module 108. An object outline for an edge correlation or normalized cross correlation can be the periphery of a bright or dark spot.

Note that an object being tracked need only be present in one of the earlier video frame, center video frame, or the later video frame at some iteration of the object detection technique to be detected.

Figure 4:
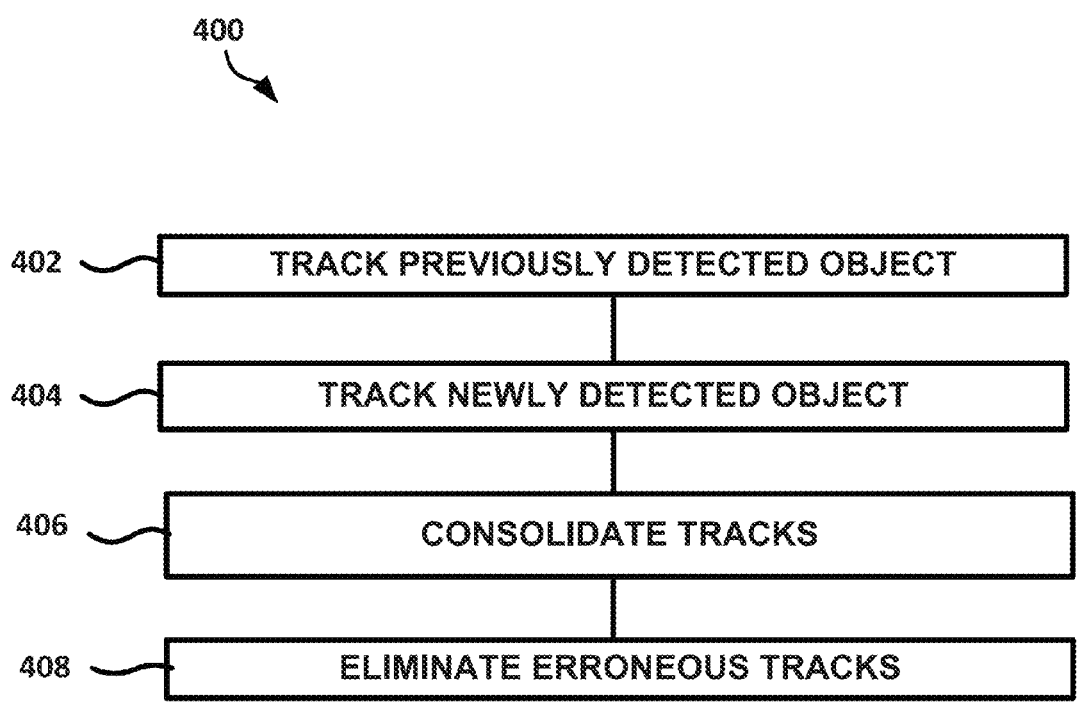
FIG. 4 shows a flow diagram of an example of a technique for tracking a change candidate.

FIG. 4 shows a flow diagram of an example of a technique 400 for tracking a change candidate. The technique 400 can be implemented by the track module 108. At 402, a previously detected object (e.g., an object outline) can be tracked, such as by using the edge correlation outline points associated with the outline with the stronger contrast. The previously detected object can be tracked from the earlier video frame to the later video frame, or vice versa, such as by using a hybrid correlation technique or the edge correlation outline points.

An outline (e.g., an outline of the object or points in or around the outline of the object) in the center video frame can be reverse projected into the earlier or later video frame (depending if forward or backward tracking is going to be used). An inverse of the affine transformation can be applied to the outline, the outline can be projected to the ground of the respective video frame, and then the ground projected outline can be projected up into the respective video frame space. Since each of these transformations is invertible, the outline points can project to the proper geo-location in the respective video frame. A set of outline points in the earlier or later video frame has now been obtained.

A normalized cross-correlation can be a standard image-to-image correlation technique. The normalized cross-correlation was designed for static scenes, extracts a rectangular portion of a video frame to use as a template, and correlates the rectangular portion with another video frame. The normalized cross-correlation technique does not work well for some objects, such as an object with an associated rectangular portion that has insufficient internal detail (e.g., pixel intensity differences) on which to correlate. Insufficient internal detail can occur in low light level conditions.

A hybrid correlation technique that combines edge correlation and an adapted normalized cross-correlation can be used to overcome a deficiency of the NCC previously discussed. The hybrid correlation technique can apply an edge-correlation process to pixels in an outline of a change candidate. This hybrid technique can be accurate in providing a correct location of the change candidate in the later video frame. This hybrid technique can be more robust than a NCC or an edge correlation alone.

All the pixels in and around an object do not need to be projected to the later video frame to perform an NCC. Projecting a subset (e.g., a random sampling) of all the pixels can provide an accurate result, such as a result as accurate as projecting all of the pixels in and around the object (e.g., in and around the object outline). Reducing the number of pixels projected can reduce the time it takes the process to track an object from one video frame to another. A number of pixels sampled from the interior of the object outline can be greater than a number of pixels sampled exterior to the object outline. For each of these sampled pixels, the pixel location and intensity can be maintained. The sampled pixels can be registered (e.g., located in the later video frame) using an adaptation of a NCC. The adaptation can include the NCC using a disjoint (e.g., non-contiguous) set of pixels as its template rather than a rectangular region of the video frame.

The edge correlation and the NCC techniques can each use a set of points (e.g., each can use a different set of points) and generate a score for each row, column point in an uncertainty area as a function of the respective set of points. The NCC can use a disjoint set of points as a template to correlate with another video frame (rather than a rectangular portion of the video frame as in the template used in the standard NCC technique).

The edge correlation score (at an offset) can be the sum of the gradient magnitude of the outline pixels in the respective video frame times a phase match between the earlier and later video frames at the pixel location. The gradient magnitude can measure how strong the edge is and the gradient phase can measure the direction of the edge (or a direction perpendicular to the edge). The phase match can include a calculation of the angle difference between the phase in the template and the phase in the respective video frame. This difference can be subtracted from 180, so as to return a positive number. If the angle between the phases is small, which is what is expected at the correct correlation offset, then 180 minus the difference is close to 180. The score that corresponds to the best match (according to the edge correlator) is where the gradient magnitude is relatively large compared to other calculated gradient magnitudes and the direction of the gradient (the phase) is similar in both video frames.

The scores from the NCC and edge correlation techniques can be combined, such as to produce a total score. The NCC can produce a value between zero and one. The maximum edge correlation score over the uncertainty region can be determined. The edge correlation score at a point in the uncertainty region can be divided by the maximum edge correlation score, so as to create a number between or including zero and one. The NCC score or the edge correlation score can be weighted, so as to reduce or enhance the effect that the score has on the calculation. Since the NCC score may not be as reliable as the edge correlation score, the edge correlation score can be weighted less than the edge correlation score. The two scores associated with the same offset can be summed and the largest of the sums calculated can correspond to the location of the object in the later video frame.

If a previously detected object is not found in the later video frame (e.g., the outline of the object is not found in the later video frame), such as can occur when an object exits the field of view of the video sensor (e.g., camera), the track associated with the previously detected object can be considered inactive. An inactive track can be removed from a set of tracks to be considered by the track module 108. In one or more embodiments, there is no previously detected object, in which case 402 can be skipped.

At 404, a newly detected object can be tracked from the later video frame until it exits the field of view or until it is found in the earlier video frame, such as by using the NCC (e.g., adapted NCC), the edge correlation technique, or a combination thereof.

More details regarding tracking, such as at 402 or 404 will now be discussed. The outline points can be used as edge points in performing an edge correlation technique to obtain a score. A gradient operator (e.g., a Sobel operator) can be used to generate a gradient phase direction. The edge points can be projected to the ground of the current frame and into the space of the immediately previous or next frame depending on whether forward or backward tracking is being performed (i.e. if the earlier frame is frame m and forward tracking is being performed the ground projected edge points can be projected to the image space of video frame m+1). Since the object may be moving or there may be jitter, slewing or zooming, between video frames the projected points may not be projected exactly onto the corresponding object in the next frame. In a system that includes a high frame rate where the time interval between frames is small, the object will not move much between frames. The higher the frame rate, the smaller the uncertainty region of a location of an object will be. For example, an uncertainty region can be plus or minus a number of row pixels and plus or minus a number of column pixels in the next frame depending on the frame rate (i.e. the number of pixels in the plus or minus column or row pixels is greater for a slower frame rate). The projected edge points can be moved around (e.g., as a fixed group of points) and an edge correlation score can be computed at each row, column offset in the uncertainty region.

The NCC can use a sampled set of points interior or exterior to the outline in the earlier or later video frame. Each of the sampled points can be assigned a pixel intensity that corresponds to the pixel intensity at that point in the respective video frame. The sampled points can be projected to the ground in the respective video frame and into the image space of a previous or next video frame (e.g., an immediately next or previous video frame) depending if forward or backward tracking is being performed. The intensity of each of the points in the sampled set can be maintained. An NCC score can be computed for each point in the uncertainty region, such as by correlating the pixel intensity at each point of the sample set of points in the respective video frame with the corresponding point in the previous or next video frame. The projected set of sampled points can be moved around (e.g., as a fixed group of points) and an NCC score can be computed at each row, column offset in the uncertainty region.

The NCC score and the edge correlation score that correspond to the same offset can be summed. The offset with the highest associated score can be determined to be the location of the outline in the previous or next video frame.

The position of the outline points and the sampled set of points can be updated in accord with the offset (e.g., by adding the offset to the location of the sampled points or the outline in the earlier or later frame). The intensities for the points in the NCC can be updated to the pixel intensities in the next or previous frame. The gradient phase direction for the outline can be calculated for the next or previous frame. The process described with regard to 402 or 404 can be repeated using the previous or next video frame and tracking the outline to the next video frame in the sequence until the object is tracked all the way to the earlier or later frame or the object disappears from the field of view.

At 406, two tracks that are determined to be from the same object can be consolidated. A track from an object can be produced when the object is tracked from the earlier video frame to the later video frame and another track can be produced when the object is tracked from the later video frame to the earlier video frame. These two tracks can be consolidated. Note that each object can have up to three tracks: (1) a continuation of an active track from the earlier video frame, (2) from change detection in the earlier video frame, or (3) from the change detection in the later video frame. These tracks can be consolidated.

Track consolidation can include using object location or velocity to help determine which tracks follow the same object. The consolidation can score each track based on the number of frames containing the track or a correlation strength over the duration of the track. A correlation score for a track can include the sum over all the frames of the top correlation score between that frame and the next. The top scoring tracks can be those tracks that had a stronger correlation score at each frame. This metric can determine which track to keep and which one to eliminate when the track consolidation determines that two or more tracks are following the same object. Track consolidation can include merging a forward track (i.e. a track created from tracking an object detected at the earlier video frame forward to the later video frame) with a backward track (i.e. a track created from tracking an object detected at the later video frame backward to the earlier video frame).

A track (e.g., an object associated with a track) in the earlier video frame may not be present in the later video frame and vice versa. An occlusion (i.e. an obstruction to the view) of a track may block a view of the object or track in one or more video frames. Partial tracks (e.g., tracks that have been broken because of an occlusion or some other reason such as intermittent video data from the camera) can be united. If a partial forward track and a partial backward track come close to each other spatially and the objects associated with each track have similar velocities, the tracks can be merged.

The outline (e.g., signature) of an object can be updated to be the outline from the most recent video frame (i.e. the video frame of the object that was captured last). This can be important when the object is turning or the moving sensor platform's view of the object is changing or has changed, such as can result in the appearance or profile of the object changing. The best representation (e.g., outline) of the object from the earlier, center, or later video frame can be carried forward as an active track or outline into a subsequent frame.

The best outline representation can be determined. The best representation can be the outline produced by the change detection object location in frame m+n, i.e. the later frame. In some cases, there may have been some reason why this outline is suboptimal, such as an occlusion obscuring the outline of the object and the older outline might be a better fit for the object. So if a total correlation strength of the track from frame m forward to frame m+n (e.g., such as in the later frames, like from the center video frame to the later video frame) is better than the correlation for the track that is going backward from the later video frame, then the forward track outline can be kept rather than the backward track outline, or vice versa.

At 408, an erroneous track can be detected or eliminated. An erroneous track can be identified by analyzing the ground movement of the associated object through the frames. The erroneous track can be caused by video flicker or jitter. Flicker or jitter can cause a static part of a scene to produce a change candidate. The change candidate can have a short-lived track, or a change candidate can persist for some time. A change candidate from flicker or jitter can be a static track, such as a track that oscillates or wiggles. Another erroneous track can include a track that exhibits very fast acceleration or a rapid direction change.

An active track that has stopped moving may be retained or not eliminated. The track can be associated with a moving object that has temporarily stopped moving, such as a vehicle at a stop light or a stop sign. An active track with a sufficiently high correlation score can be retained, such as whether the active track is moving or not provided the active track is still within the field of view of the camera 102.

A subsequent video frame can be received at the object detection module 106. The subsequent video frame can be a video frame that is at least a minimum frame time separation from the center video frame. In an embodiment in which the later video frame is the minimum frame time separation from the center video frame, the center video frame can become the earlier video frame, and the later video frame can become the center video frame. The process can be repeated. Processing that was previously done on a video frame that is used in a subsequent iteration of object detection or tracking, such as projecting the frame to ground, can be reused, such as to reduce the amount of processing or processing time of the next iteration. Other tracking techniques can operate in the space of the video frame with no use of the frames' relationship to the ground. These tracking techniques can have difficulty handling jitter, zooming, or slewing. One or more embodiments discussed herein can use a registration module to precisely register a frame to a geographical location to help handle jitter, zooming, or slewing. The hybrid track correlation technique that combines edge correlation matching with normalized cross correlation was shown to work better than either method alone. The forward and backward tracking along with track consolidation can provide an ability to correctly track and object and to maintain lock even if a particular track fails.

Figure 5:
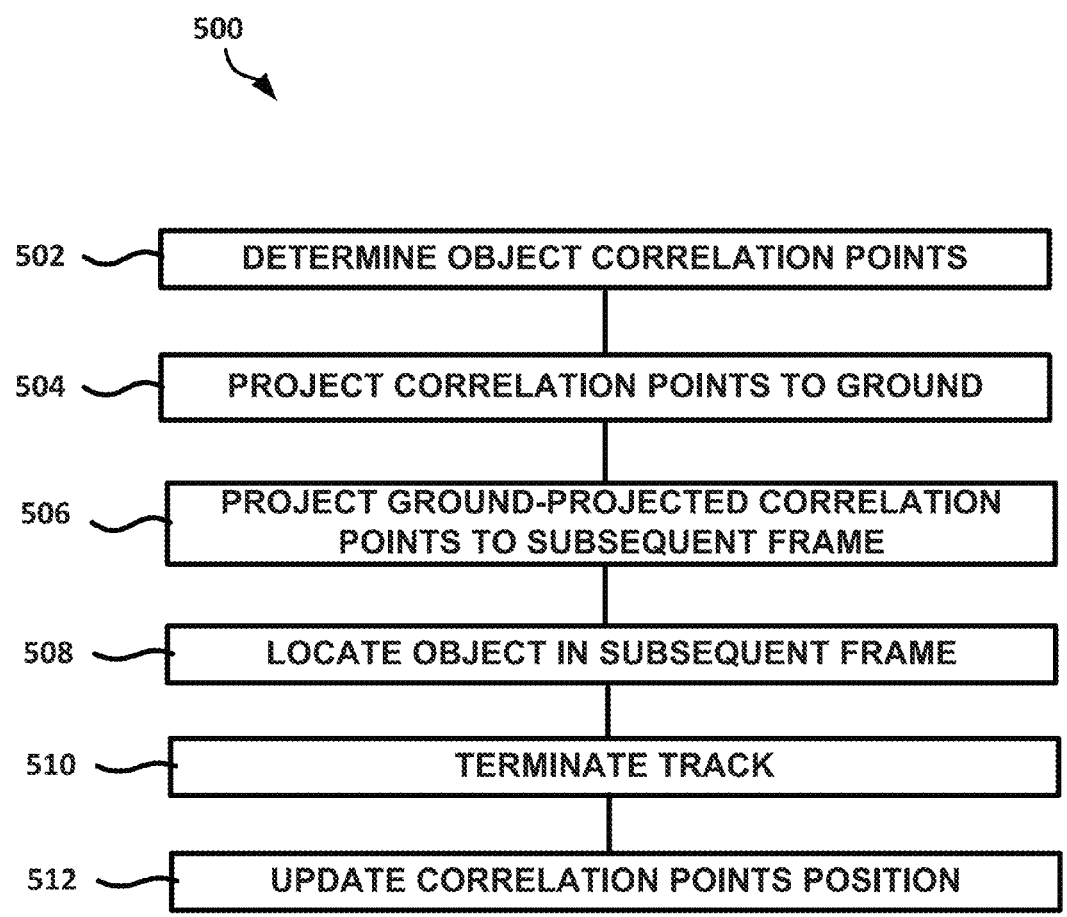
FIG. 5 shows a flow diagram of another example of a technique for tracking a change candidate.

FIG. 5 shows a flow diagram of a technique 500 for tracking an object. The technique 500 can be implemented by the track module 108. The technique 500 can be combined with at least a portion of the technique 400. At 502, object correlation points can be determined (e.g., outline points for an edge correlation technique and a sampled set of points for an adapted NCC technique can be determined). At 504, the correlation points can be projected to a ground plane of the video frame from which they were extracted. At 506, the ground-projected correlation points can be projected to a subsequent or previous video frame. At 508, the object (e.g., the outline of the object or the sampled set of points) can be located in the subsequent or previous video frame. At 510, a track can be terminated if the object cannot be located in the subsequent or previous video frame. At 512, the correlation points can be updated to be the location of the correlation points in the subsequent or previous video frame.

Figures 6A, 6B:
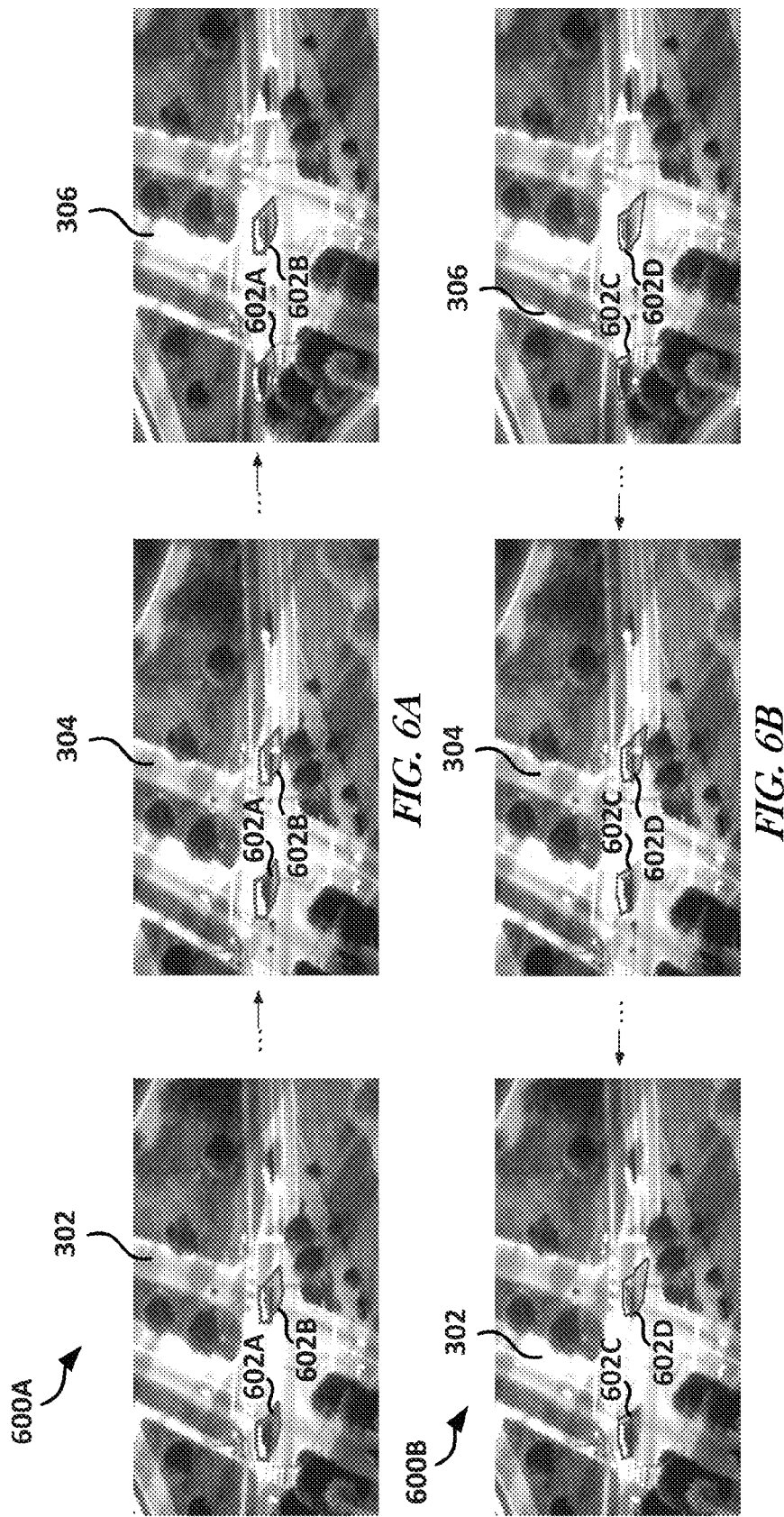
FIG. 6A shows a flow diagram of an example of a series of pictures produced from forward tracking an object outline.
FIG. 6B shows a flow diagram of an example of a series of pictures produced from backward tracking an object outline.

FIG. 6A shows an example of a series of video frames 600A with two objects 602A (e.g., object outlines) and 602B being forward tracked from the earlier video frame 302 to the later video frame 306, such as by using the technique 400 or 500. The object 602A-B, such as can be found using the object detection module 106, can be located in the earlier video frame 302. The edge correlation technique or adapted NCC can be used to locate the object 602A-B in the center video frame 304 or the later video frame 306. The object 602A-B can be located in video frames between the earlier video frame 302 and the center video frame 304 or the center video frame 304 and the later video frame 306. The object 602A-B can be located in those video frames.

FIG. 6B shows an example of a series of video frames 600B with two objects 602C (e.g., object outlines) and 602D being backward tracked from the later video frame 306 to the earlier video frame 302, such as by using the technique 400 or 500. The object 602C-D, such as can be found using the object detection module 106, can be located in the later video frame 306. The edge correlation technique or adapted NCC can be used to locate the object 602C-D in the center video frame 304 and the earlier video frame 302. The object 602C-D can be located in video frames between the later video frame 306 and the center video frame 304 or the center video frame 304 and the earlier video frame 302. The object 602C-D can be located in those video frames. Note that the object outline of an object in forward tracking can be different than the object outline of the same object in backward tracking, such as shown in FIGS. 6A and 6B.

Note that not all of the bright or dark spots in the difference video frame 312 are being tracked in the example of FIG. 6. This is because one or more of the bright or dark spots in the difference image were determined to be false changes.

Figure 7:
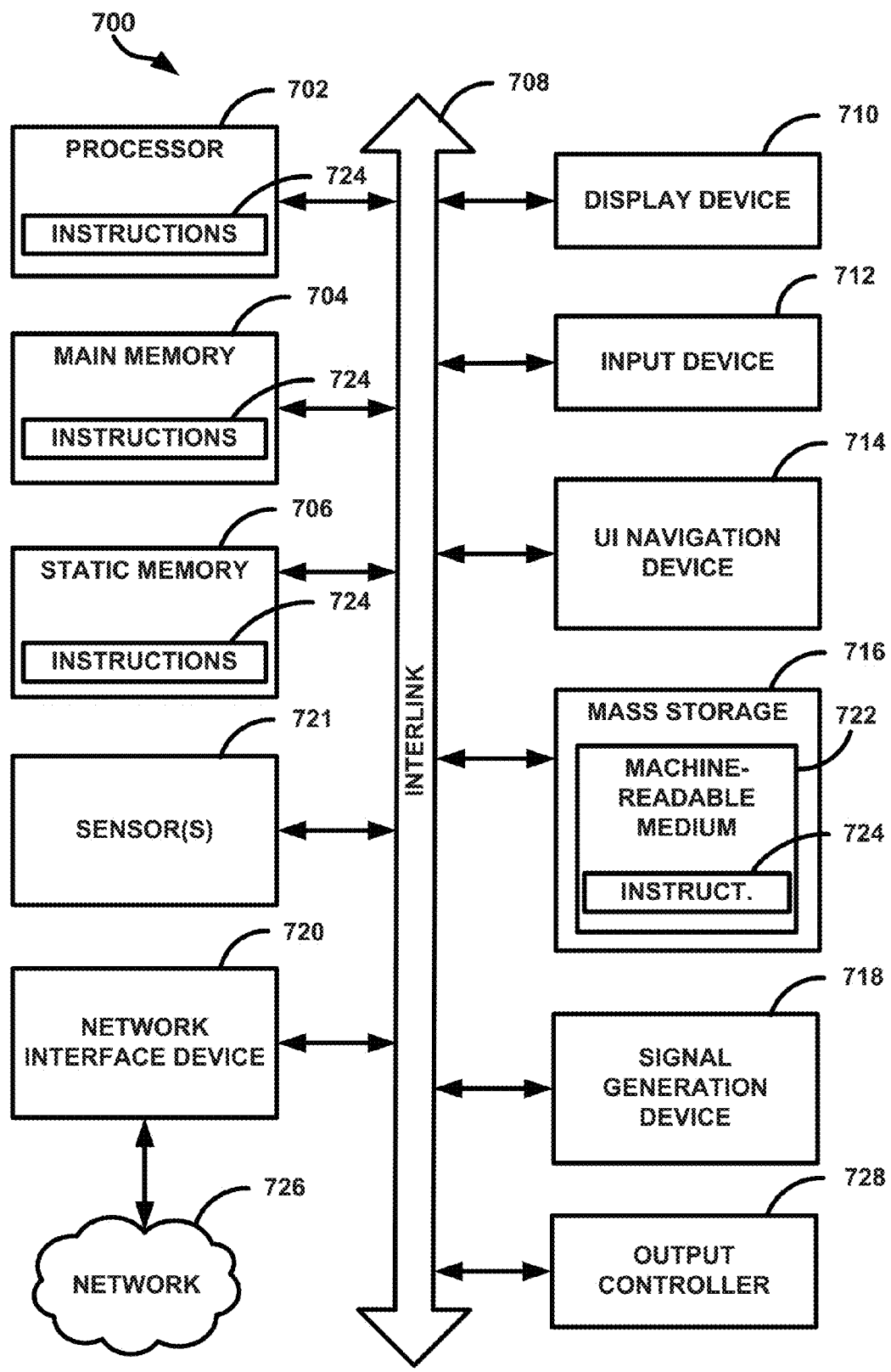
FIG. 7 shows a block diagram of an example of a machine upon which any of one or more techniques (e.g., methods) or processes discussed herein may be performed.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 612 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

EXAMPLES AND NOTES

The present subject matter may be described by way of several examples.

Example 1 can include or use subject matter (such as an apparatus including a processor configured to perform acts, a method, a means for performing acts, or a device readable memory including instructions that, when performed by the device, can cause the device to perform acts), such as can include or use (1) obtaining first and second video frames, the first video frame captured at a time before the second video frame was captured, (2) projecting the first video frame to the ground plane of the first video frame to create a first ground projected video frame, (3) projecting the second video frame to the ground plane of the second video frame to create a second ground projected video frame, or (4) projecting the first and second ground projected video frames to a space in a center video frame captured at a time between the first and second video frames.

Example 2 can include or use, or can optionally be combined with the subject matter of Example 1, to include or use (1) determining tie points between the first video frame and the center video frame, (2) determining tie points between the second video frame and the center video frame, or (3) aligning the first and second video frames with the center video frame using the tie points.

Example 3 can include or use, or can optionally be combined with the subject matter of at least one of Examples 1-2, to include or use registering the first and second video frames to a reference image frame before creating the first and second ground projected video frames, respectively.

Example 4 can include or use, or can optionally be combined with the subject matter of at least one of Examples 1-3, to include or use wherein registering the first and video frames includes registering the first and second video frames to a highly accurate reference image so as to geo-locate the locations of the images to within a few meters of where the images of the first and second video frame are located.

Example 5 can include or use, or can optionally be combined with the subject matter of at least one of Examples 1-4, to include or use wherein the time between the first and second video frames is substantially large enough to allow an object travelling at a specified minimum speed to travel at least one length of the object between the first and second video frames.

Example 6 can include or use, or can optionally be combined with the subject matter of Example 5, to include or use wherein the specified minimum speed is less than or equal to about ten miles per hour and the object is a vehicle.

Example 7 can include or use, or can optionally be combined with the subject matter of at least one of Examples 1-6, to include or use wherein the center video frame was captured at a time about halfway between the time the first video frame was captured and the time the second video frame was captured.

Example 8 can include or use, or can optionally be combined with the subject matter of at least one of Examples 1-7, to include or use detecting a change between the aligned first and second video frames.

Example 9 can include or use, or can optionally be combined with the subject matter of at least one of Examples 1-8, to include or use (1) wherein detecting the change between the aligned first and second video frames includes subtracting corresponding pixel intensity values of the second video frame from pixel intensity values of the first video frame, (2) determining if the difference is greater than a threshold value, or (3) in response to determining the difference is greater than a threshold, determining that a pixel corresponding to the difference is associated with a change between the first video frame and the second video frame.

Example 10 can include or use, or can optionally be combined with the subject matter of Example 9, to include or use determining contiguous pixels that have been determined to be associated with a change, or comparing an outline of the determined contiguous pixels to an outline of a change candidate to determine if the contiguous pixels correspond to a valid change candidate.

Example 11 can include or use, or can optionally be combined with the subject matter of Example 10, to include or use in response to determining the outline corresponds to a valid change candidate, locating the change candidate in the first video frame and the last video frame, or tracking the change candidate from the first video frame to the last video frame so as to create a forward track and tracking the change candidate from the last video frame to the first video frame to create a backward track of the change candidate.

Example 12 can include or use, or can optionally be combined with the subject matter of Example 11, to include or use wherein locating the change candidate in the last video frame includes using an edge correlation technique to produce a set of outline pixels and an adapted normalized cross-correlation technique to determine where the set of outline pixels are located in the last video frame, wherein the adapted normalized cross-correlation technique includes using a non-contiguous set of pixels in and near the set of outline pixels as an input to locate the change candidate.

Example 13 can include or use, or can optionally be combined with the subject matter of at least one of Examples 11-12, to include or use consolidating the forward and backward tracks.

Example 14 can include or use, or can optionally be combined with the subject matter of at least one of Examples 11-13, to include or use eliminating a track including eliminating at least one of (1) a track with an associated change candidate that includes an acceleration that is greater than an acceleration threshold; (2) a track that is exhibiting an oscillatory behavior; and (3) a track associated with an associated change candidate that is detected for the first time and determined to be stationary.

Example 15 can include or use subject matter (such as an apparatus including a processor configured to perform acts, a method, a means for performing acts, or a device readable memory including instructions that, when performed by the device, can cause the device to perform acts), such as can include or use (1) determining a location of a change candidate from a first video frame in a second video frame using a combination of an edge correlation and an adapted normalized cross-correlation, the second video frame captured at a time after a time the first video frame was captured, (2) forward tracking the change candidate from the first video frame to the second frame so as to create a forward track, or (3) backward tracking the change candidate from the second video frame to the first video frame so as to create a backward track.

Example 16 can include or use, or can optionally be combined with the subject matter of Example 15, to include or use (1) wherein the edge correlation includes determining a change candidate outline correlation point, (2) projecting the outline correlation point to a ground plane of the first video frame so as to create a ground projected correlation point, (3) and projecting the ground projected correlation point to the second video frame.

Example 17 can include or use, or can optionally be combined with the subject matter of at least one of Examples 15-16, to include or use wherein the adapted normalized cross-correlation includes using a non-contiguous set of pixels in and near the ground projected correlation point as an input to locate the correlation point in the second frame.

Example 18 can include or use, or can optionally be combined with the subject matter of at least one of Examples 16-17, to include or use updating a location of the correlation points as the location of the correlation points in the second frame.

Example 19 can include or use, or can optionally be combined with the subject matter of at least one of Examples 15-18, to include or use consolidating the forward and backward tracks.

Example 20 can include or use, or can optionally be combined with the subject matter of at least one of Examples 15-19, to include or use eliminating the forward and backward tracks, including eliminating forward and backward tracks with at least one of (1) an associated change candidate that includes an acceleration that is greater than an acceleration threshold; (2) an oscillatory behavior; and (3) an associated change candidate that is detected for the first time and determined to be stationary.

Example 21, can include or use, or can optionally be combined with the subject matter of at least one of Examples 15-20, to include or use wherein the time between the first and second video frames is substantially large enough to allow an object travelling at a specified minimum speed to travel at least one length of the object between the first and second video frames.

Example 22 can include or use, or can optionally be combined with the subject matter of Example 21, to include or use wherein the specified minimum speed is less than or equal to about ten miles per hour and the object is a vehicle.

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method comprising:
obtaining first and second video frames, the first video frame captured at a first time and the second video frame captured at a second time, the first time occurring before the second time, and the first and second video frames including a first and second image, respectively, of a common geo-location;
projecting, using a computer processor, the first video frame to a ground plane of the first video frame to create a first ground projected video frame;
projecting the second video frame to a ground plane of the second video frame to create a second ground projected video frame; and
projecting the first and second ground projected video frames to a space in a center video frame captured at a time between the first and second times, the center video frame including a third image of the common geo-location.

2. The method of claim 1, further comprising:
determining a first set of points that appear in the first video frame and the center video frame;
determining a second set of points that appear in the second video frame and the center video frame; and
aligning the first and second video frames with the center video frame using the first and second sets of points, respectively.

3. The method of claim 2, wherein a time difference between the first and second times is large enough to allow an object travelling at a specified minimum speed to travel at least one length of the object in the time difference.

4. The method of claim 3, wherein the center video frame is captured at a time about halfway between the first and second times.

5. The method of claim 2, further comprising:
detecting a pixel change between the aligned first and second video frames including:
subtracting corresponding pixel intensity values of the second video frame from pixel intensity values of the first video frame,
determining if the difference is greater than a threshold, and
in response to determining the difference is greater than a threshold, determining that a pixel corresponding to the difference is associated with a pixel that has changed between the first video frame and the second video frame.

6. The method of claim 5, further comprising:
determining contiguous pixels that have been determined to be associated with a change; and
comparing an outline of the determined contiguous pixels to an outline of a change candidate to determine if the contiguous pixels correspond to a valid change candidate.

7. The method of claim 1, further comprising:
registering the first and second video frames to a reference image frame before creating the first and second ground projected video frames, respectively.

8. A non-transitory computer readable storage device comprising instructions stored thereon, the instructions, which when executed by a machine, cause the machine to perform operations comprising:
obtaining first and second video frames, the first video frame captured at a first time and the second video frame captured at a second time, the first time occurring before the second time, and the first and second video frames including a first and second image, respectively, of a common geo-location;
projecting, using a computer processor, the first video frame to a ground plane of the first video frame to create a first ground projected video frame;
projecting the second video frame to a ground plane of the second video frame to create a second ground projected video frame; and
projecting the first and second ground projected video frames to a space in a center video frame captured at a time between the first and second times, the center video frame including a third image of the common geo-location.

9. The storage device of claim 8, further comprising instructions, which when executed by the machine, cause the machine to perform operation comprising:
determining a first set of points that appear in the first video frame and the center video frame;
determining a second set of points that appear in the second video frame and the center video frame; and
aligning the first and second video frames with the center video frame using the first and second sets of points, respectively.

10. The storage device of claim 9, further comprising instructions, which when executed by the machine, cause the machine to perform operations comprising:
detecting a pixel change between the aligned first and second video frames, wherein the instructions for detecting the pixel change include instructions, which when executed by the machine, cause the machine to perform operations comprising:
subtracting corresponding pixel intensity values of the second video frame from pixel intensity values of the first video frame,
determining if the difference is greater than a threshold, and
in response to determining the difference is greater than a threshold, determining that a pixel corresponding to the difference is associated with a pixel that has changed between the first video frame and the second video frame.

11. The storage device of claim 10, further comprising instructions, which when executed by the machine, cause the machine to perform operations comprising:
determining contiguous pixels that have been determined to be associated with a change; and
comparing an outline of the determined contiguous pixels to an outline of a change candidate to determine if the contiguous pixels correspond to a valid change candidate.

12. The storage device of claim 8, further comprising instructions, which when executed by the machine, cause the machine to perform operation comprising:
registering the first and second video frames to a reference image frame before creating the first and second ground projected video frames, respectively.

13. The storage device of claim 8, wherein the instructions for obtaining first and second video frames, include instructions for obtaining first and second video frames with a substantially large time difference between the first time and the second time, the time difference large enough to allow an object travelling at a specified minimum speed to travel at least one length of the object in the time difference.

14. The storage device of claim 13, wherein the instructions for projecting the first and second ground projected video frames to a space in a center video frame captured at a time between the first and second video frames include instructions for projecting the first and second ground projected video frames to a space in a center video frame captured at a time about halfway between the first time and the second time.

15. An apparatus comprising an object detection module configured to:
- obtain first and second video frames, the first video frame captured at a first time and the second video frame captured at a second time, the first time occurring before the second time, and the first and second video frames including a first and second image, respectively, of a common geo-location;
- project the first video frame to a ground plane of the first video frame to create a first ground projected video frame;
- project the second video frame to a ground plane of the second video frame to create a second ground projected video frame; and
- project the first and second ground projected video frames to a space in a center video frame captured at a time between the first and second times, the center video frame including a third image of the common geo-location.

16. The apparatus of claim 15, wherein the object detection module is further configured to:
- determine a first set of points that appear in the first video frame and the center video frame;
- determine a second set of points that appear in the second video frame and the center video frame; and
- align the first and second video frames with the center video frame using the first and second sets of points, respectively.

17. The apparatus of claim 16, wherein the object detection module configured to obtain first and second video frames, includes the object detection module configured to obtain first and second video frames wherein a time difference between the first and second times is large enough to allow an object travelling at a specified minimum speed to travel at least one length of the object in the time difference.

18. The apparatus of claim 16, wherein the object detection module is further configured to:
- detect a pixel change between the aligned first and second video frames including:
- subtract corresponding pixel intensity values of the second video frame from pixel intensity values of the first video frame,
- determine if the difference is greater than a threshold, and
- in response to determining the difference is greater than a threshold, determine that a pixel corresponding to the difference is associated with a pixel that has changed between the first video frame and the second video frame.

19. The apparatus of claim 15, further comprising a video registration module configured to register the first and second video frames to a reference image frame before creating the first and second ground projected video frames, respectively.

20. The apparatus of claim 19, wherein the object detection module configured to project the first and second ground projected video frames to a space in a center video frame captured at a time between the first and second video frames includes the processor configured to project the first and second ground projected video frames to a space in the center video frame captured at a time about halfway between the first and second times.

* * * * *